March 14, 1961
W. WERNER
2,974,415
TOOL GUIDING DEVICE FOR GUIDING A TOOL ALONG THE CURVES OF INTERSECTION OF TWO INTERSECTING CYLINDRICAL TUBES
Filed Aug. 24, 1953
10 Sheets-Sheet 6
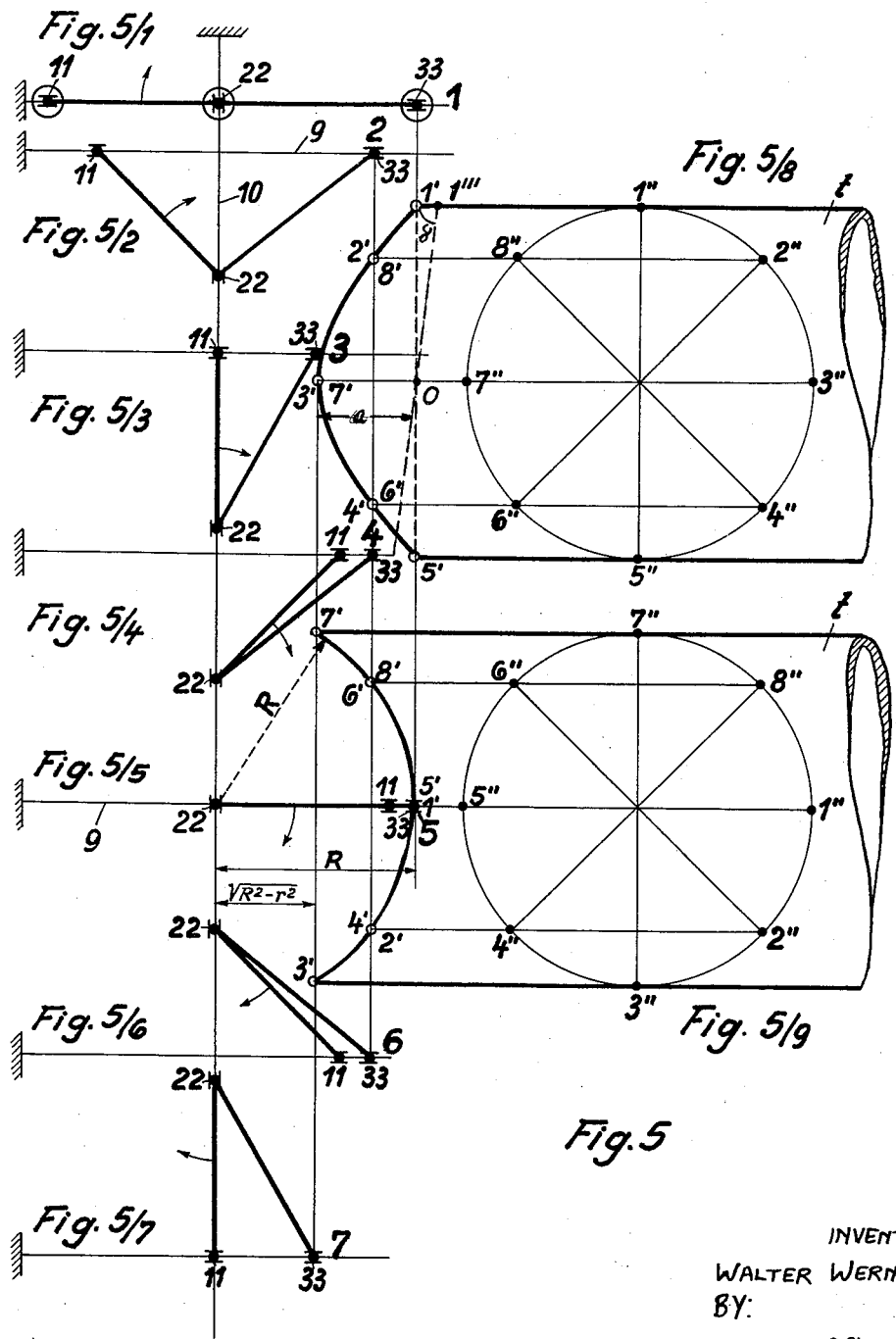
INVENTOR:
WALTER WERNER
BY:

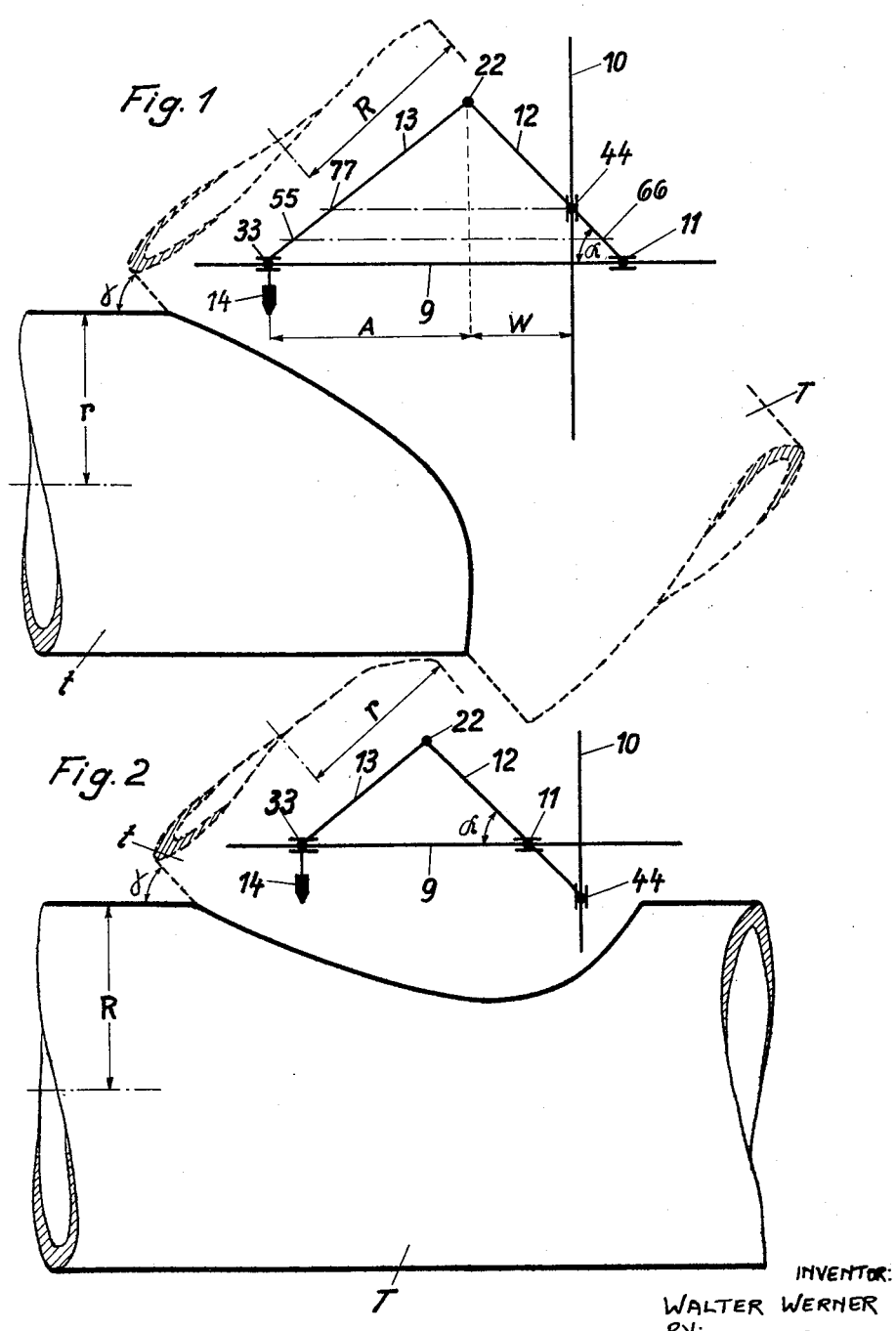

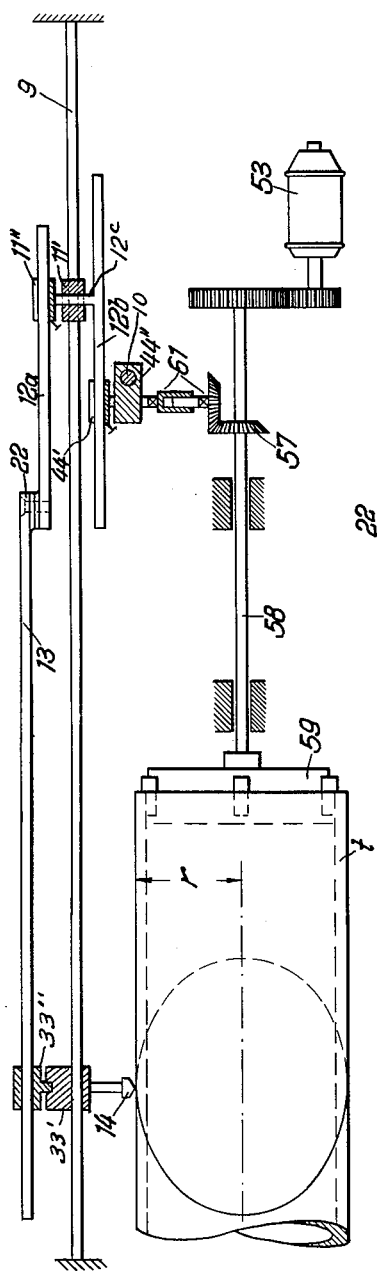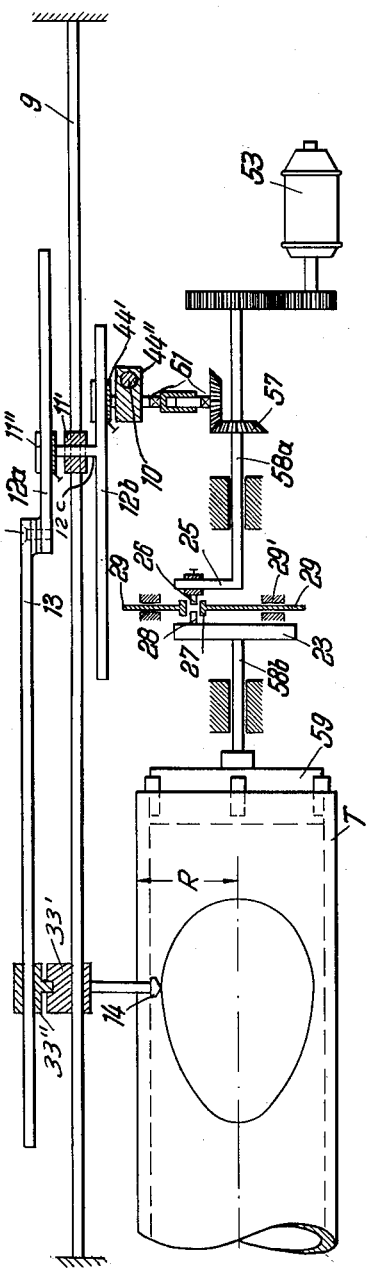

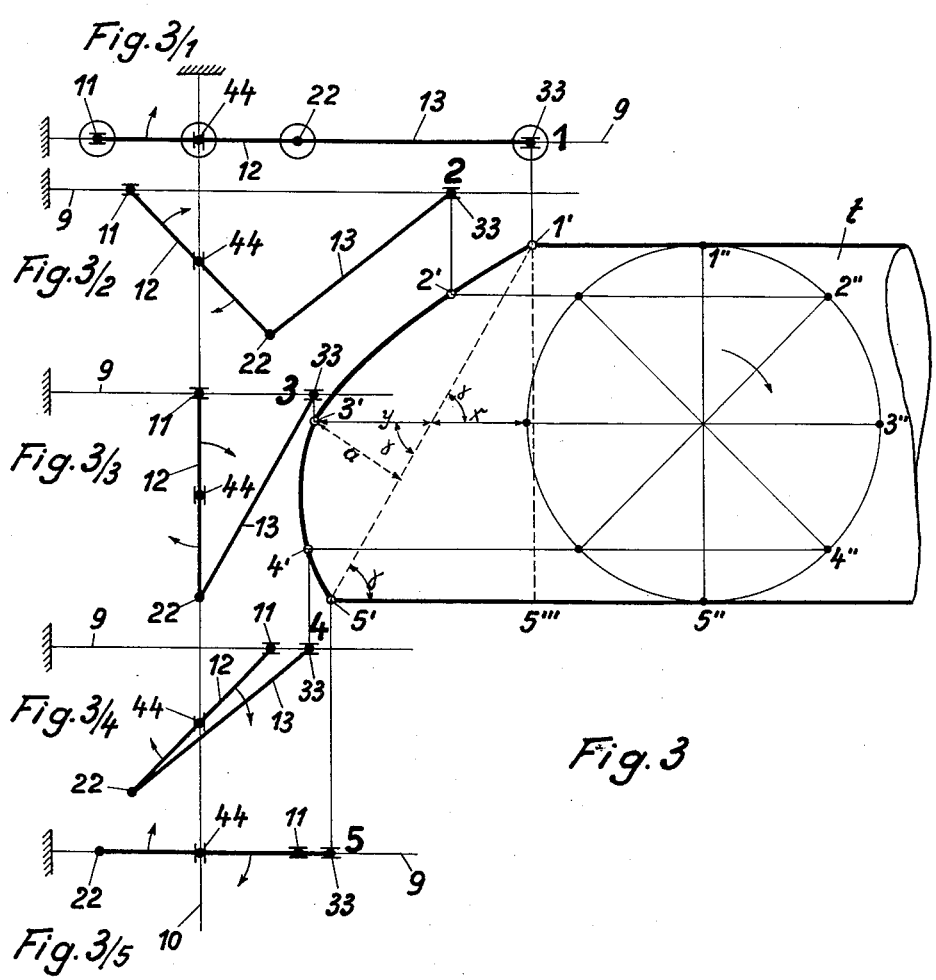

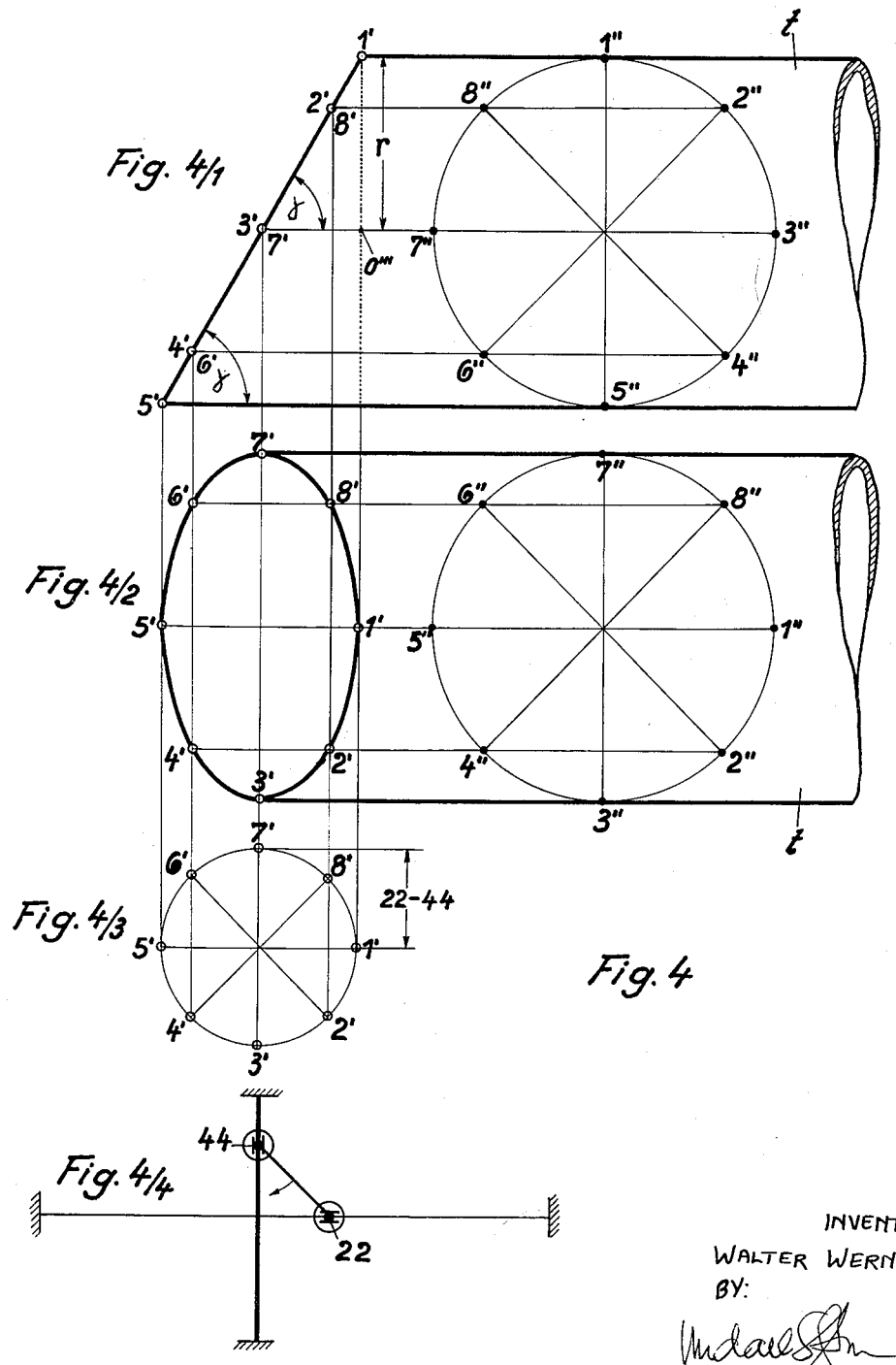

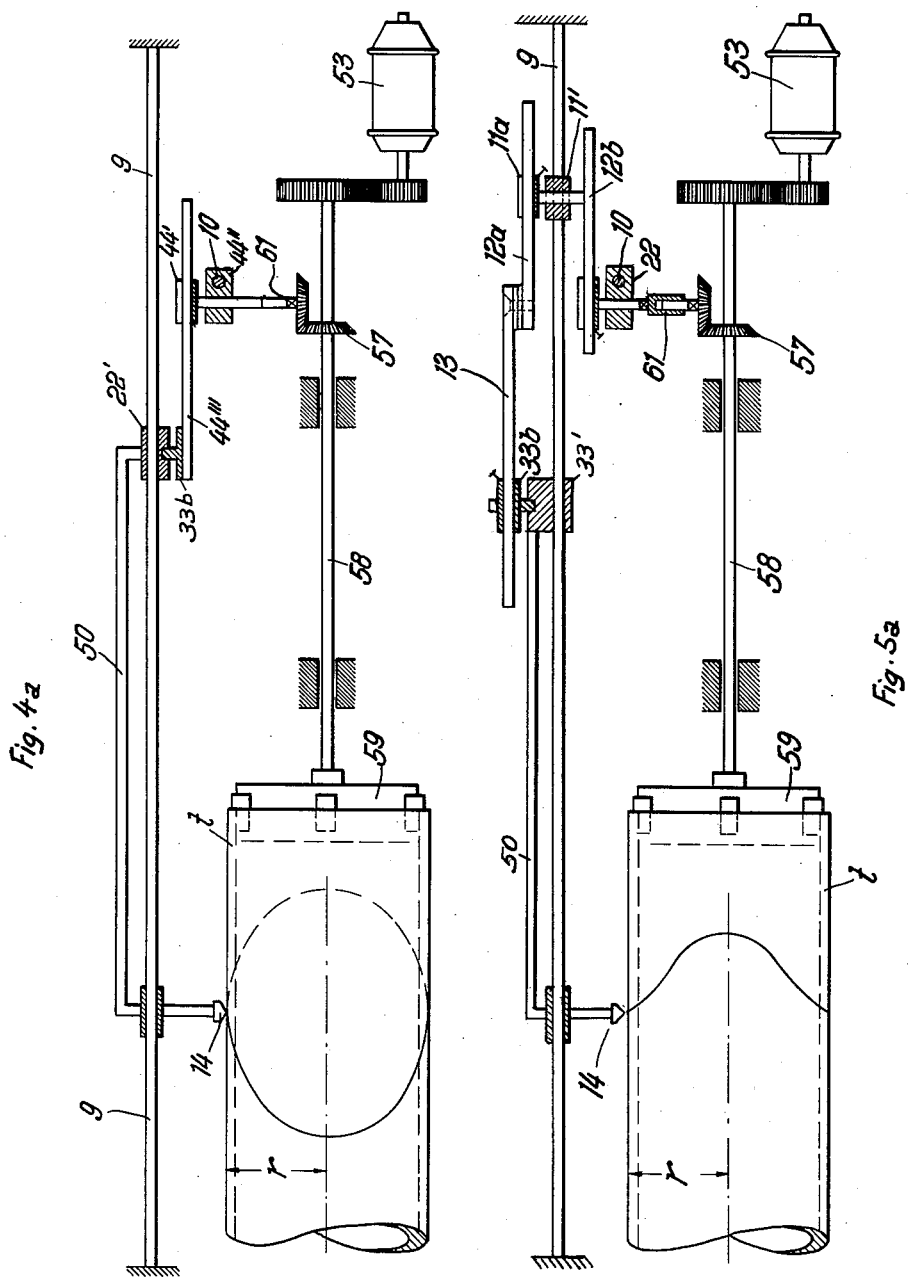

INVENTOR:
WALTER WERNER
BY:

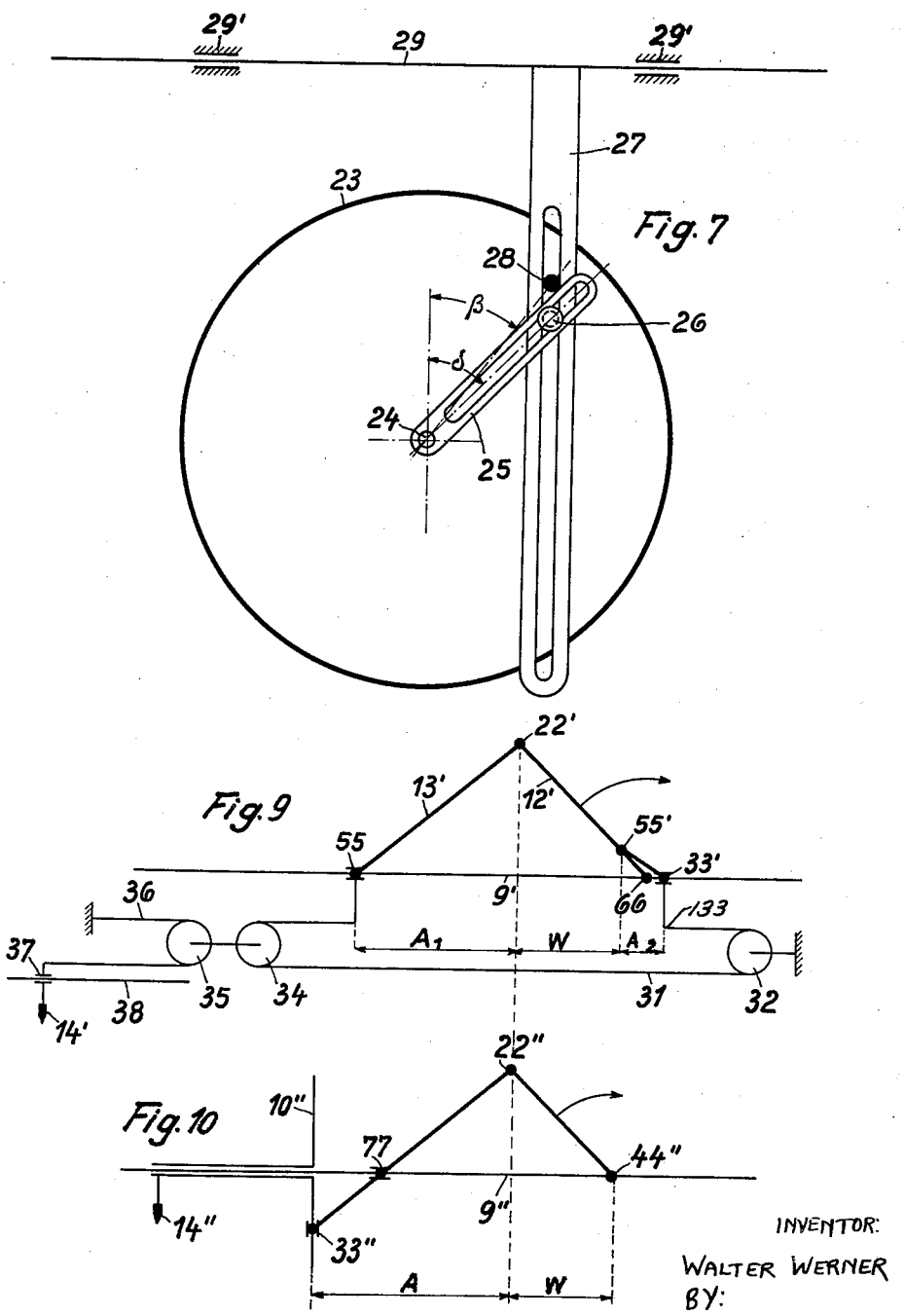

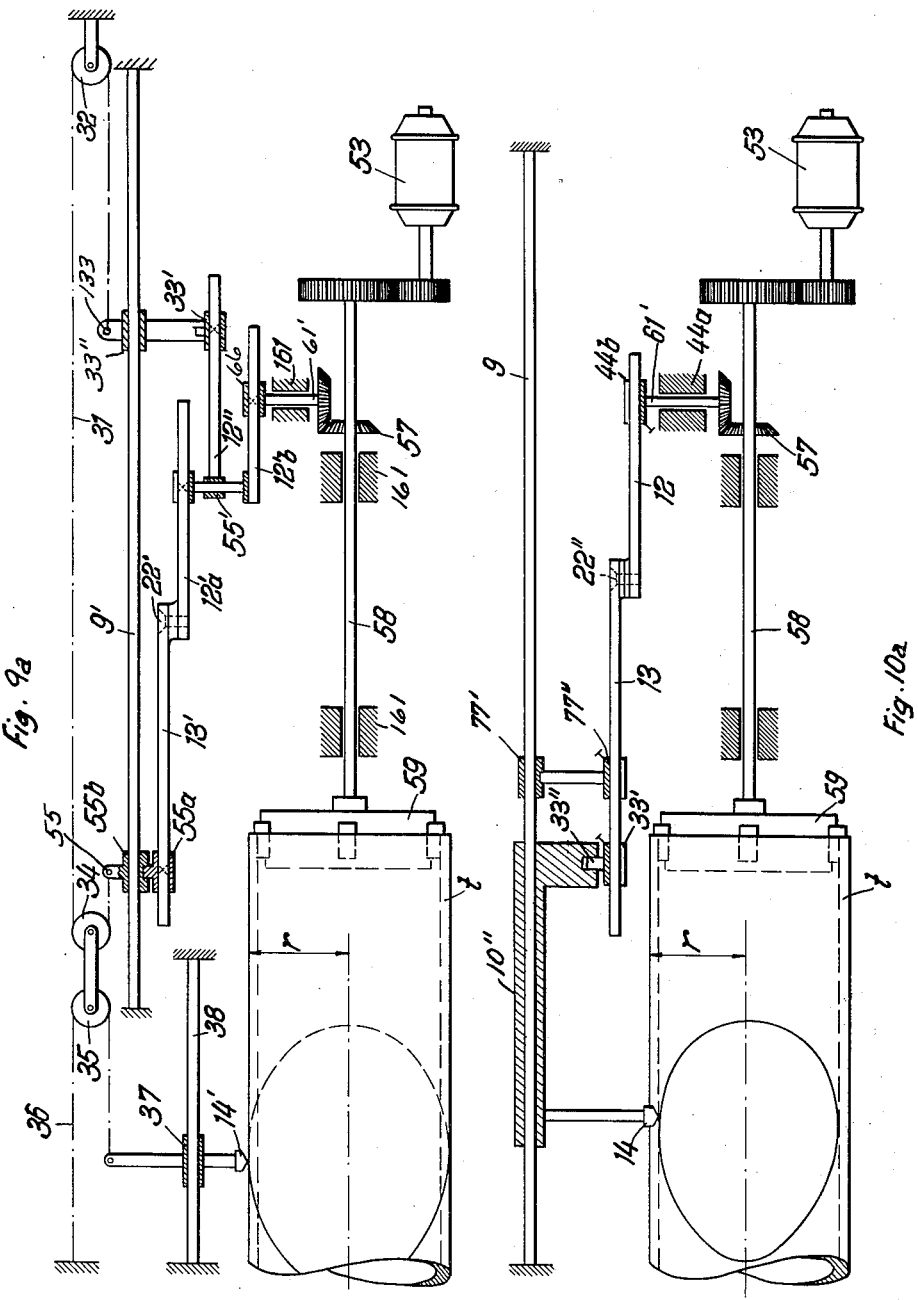

March 14, 1961
W. WERNER
2,974,415
TOOL GUIDING DEVICE FOR GUIDING A TOOL ALONG THE
CURVES OF INTERSECTION OF TWO INTERSECTING
CYLINDRICAL TUBES
Filed Aug. 24, 1953
10 Sheets-Sheet 10
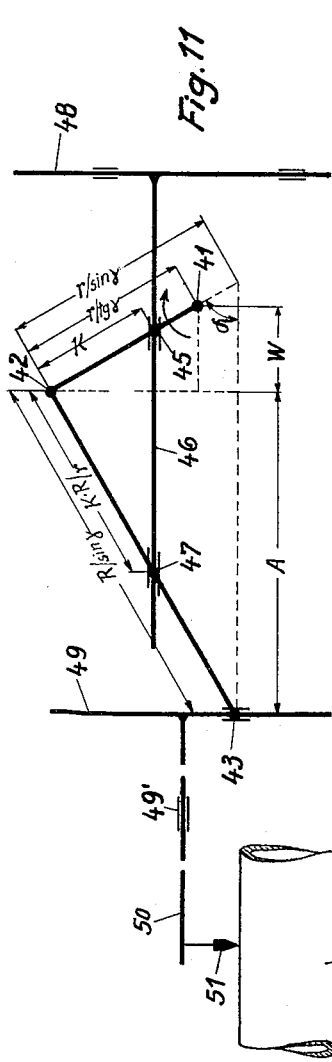
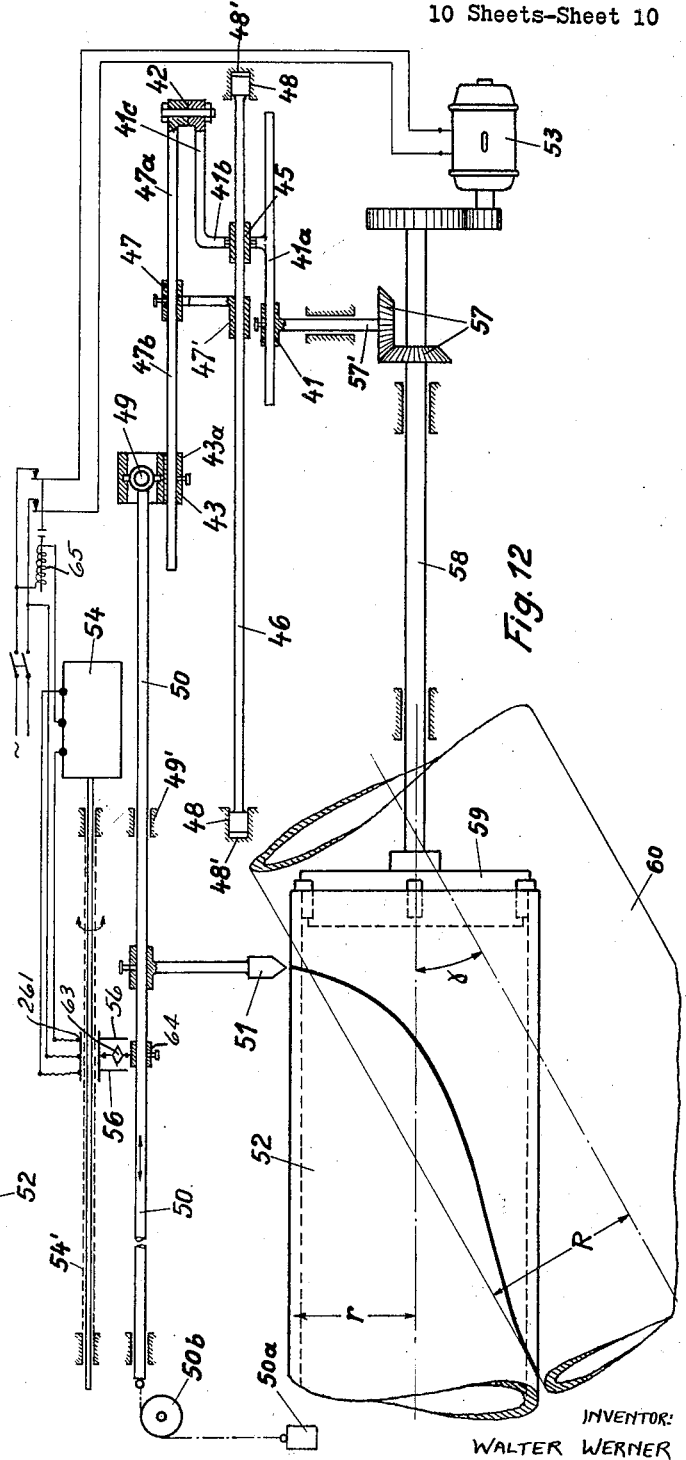
INVENTOR:
WALTER WERNER
BY:

United States Patent Office 2,974,415
Patented Mar. 14, 1961

2,974,415

TOOL GUIDING DEVICE FOR GUIDING A TOOL ALONG THE CURVES OF INTERSECTION OF TWO INTERSECTING CYLINDRICAL TUBES

Walter Werner, Mulheim (Ruhr), Germany, assignor of one-third to Willi Muller and one-third to Josef Muller, both of Opladen, near Koln, Germany Filed Aug. 24, 1953, Ser. No. 375,920
In Germany Apr. 14, 1949

Public Law 619, Aug. 23, 1954
Patent expires Apr. 14, 1969

17 Claims. (Cl. 33—21)

The present invention relates to an apparatus for cutting cylindrical tubes along predetermined lines, and more particularly to a tool guiding device for guiding a tool along the curves of intersection formed by two intersecting cylindrical tubes.

When two cylindrical tubes are joined by a welding seam, the larger tube has to be first cut out to form a hole whose edge corresponds to the smaller tube, and the smaller cylindrical tube has to be cut to form a curved edge corresponding to the edge of the cut out hole in the larger tube. When two tubes are joined at an angle, the curve of intersection is a three-dimensional curve which is difficult to determine.

It is the object of the present invention to provide means for moving a tool along a curve which corresponds to the line of intersection of two cylinders.

It is another object of the present invention to provide a tool by which a cylindrical tube can be cut to form an edge corresponding to the line of intersection with another cylindrical tube.

It is a further object of the present invention to provide a rotary tool guiding means which is guided on straight guide means in such manner that an operating member attached thereto moves along a predetermined three-dimensional curve.

With these objects in view, the present invention mainly consists in a device comprising, in combination, first straight guiding means; second guiding means; first lever means mounted at one end thereof turnably and slidably on the first straight guiding means, the first lever means being mounted at a point between its ends turnable on the second guiding means; a second lever means pivotally connected at one end thereof to the other end of the first lever means and turnably mounted at a point spaced from the one end thereof on one of the guiding means; and means for turning one of the lever means.

The present invention further consists of a device for guiding an operating member and comprises in combination, first straight guiding means, second straight guiding means extending transverse to the first straight guiding means, first lever means mounted at one end thereof turnably and slidably on the first straight guiding means, the first lever means being mounted at a point between its ends turnably and slidably on the second straight guiding means, a second lever means pivotally connected at one end thereof to the other end of the first lever means and turnably mounted at a point spaced from the one end thereof on one of the straight guiding means, means for turning one of the lever means about its point of mounting on that one of the first and second straight guiding means to which both the first and second lever means are attached, an operating member connected to one of the lever means, and being guided for rectilinear movement, supporting means for supporting an object to be operated on by the operating member for movement in a direction transverse to the first guiding means, and drive means for turning the lever means and for moving the supporting means in synchronism.

In the event that two cylindrical tubes are to be joined at an angle $\gamma$, and that the radius of the larger tube is R, and the radius of the smaller cylindrical tube r, according to the present invention two levers are provided which are pivoted to each other and have a length of $$\frac{B}{\sin \gamma}$$

and $$\frac{r}{\sin \gamma}$$

respectively, when the smaller cylindrical tube is to be cut.

During the cutting operation the smaller cylindrical tube is rotated at the same angular velocity as the lever having the length $$\frac{r}{\sin \gamma}$$

The larger cylindrical tube is not rotated during the operation, but is oscillated about its axis.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings, in which:

Fig. 1 is a schematic view of a preferred embodiment of the present invention applied to the smaller tube;

Fig. 1a is a plan view of a practical embodiment corresponding to Fig. 1;

Fig. 2 is a schematic view of the same embodiment applied to the larger tube;

Fig. 2a is a plan view of a practical embodiment corresponding to Fig. 2;

Figure 6:
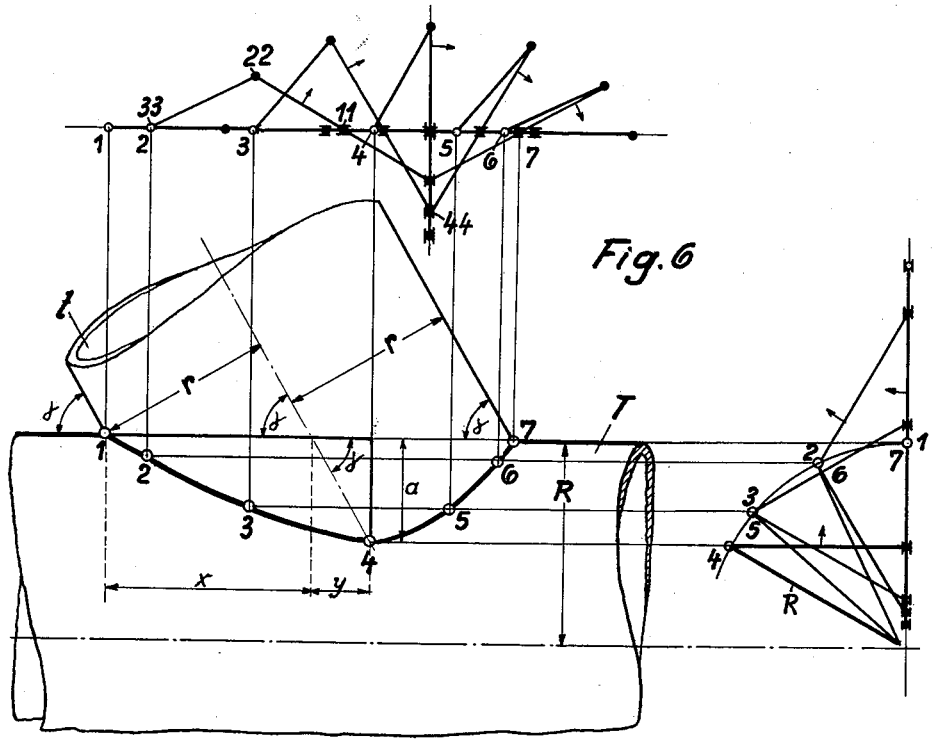
Figure 8:
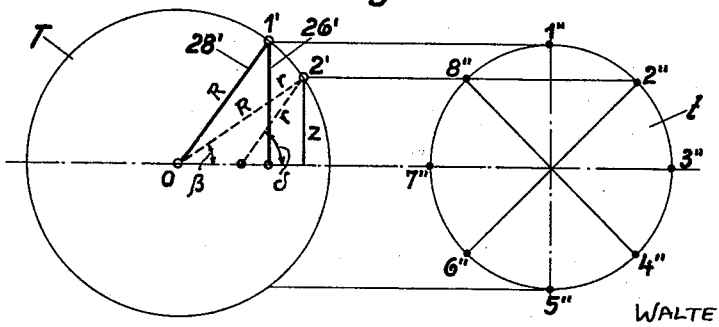

Figs. 3/1–5 schematically illustrate the positions of the tool guiding device according to the present invention during a cutting operation;

Figs. 4/1–4 schematically illustrate the cutting operation for cutting a cylindrical tube intersecting with a cylinder having an infinite radius;

Fig. 4a is a plan view of a practical embodiment corresponding to Fig. 4;

Figs. 5/1–9 schematically illustrate the tool guiding device in several consecutive positions during cutting of a cylindrical tube which is to be joined with another tube at an angle of 90°;

Fig. 5a is a plan view of a practical embodiment corresponding to Fig. 5;

Fig. 6 illustrates the arrangement of Fig. 2 in a series of consecutive positions during the operation;

Fig. 7 is a side view of a device for oscillating the larger cylindrical tube during the cutting operation;

Fig. 8 illustrates the geometrical construction of the device of Fig. 7;

Fig. 9 is a schematic view illustrating a modified embodiment of the present invention;

Fig. 9a is a plan view of a practical embodiment corresponding to Fig. 9;

Fig. 10 schematically illustrates a modified embodiment of the tool guiding device according to the present invention;

Fig. 10a is a plan view of a practical embodiment corresponding to Fig. 10;

Fig. 11 schematically illustrates a modification of the arrangement shown in Fig. 10; and Fig. 12 is a plan view of a preferred embodiment of the present invention corresponding to the arrangement illustrated in Fig. 11.

Referring now to the drawings, and more particularly to Figs. 1 and 2, the tool guiding device illustrated therein includes two levers 12 and 13 which are pivotally connected at 22. The lever ends are turnably and slidably guided by means of sliding means 11 and 33, respectively, on a fixed straight guiding means 9 which extends parallel to the axis of the cylindrical tube to be cut. A further straight guiding means 10 extends normal to the axis of the tube $t$ to be cut and guides the lever 12 which is turnably connected with a sliding means 44 sliding on guiding means 10.

The sliding points 11 and 33 are spaced from the pivot point 22 at distances whose ratio is $r/R$. The actual length of the distances of the points 11 and 33, respectively, from the point 22 is determined by the fact whether the curve of intersection is to be cut on the smaller cylindrical tube, or on the larger cylindrical tube.

In the event that the smaller cylindrical tube $t$ is to be cut as shown in Fig. 1, the lever 12 has a length of $$\frac{r}{\sin \gamma}$$

and the lever 13 a length of $$\frac{R}{\sin \gamma}$$

$\gamma$ being the angle between the axes of the smaller cylindrical tube $t$ and the larger cylindrical tube T. In the event that the larger cylindrical tube T is to be cut as shown in Fig. 2, the lever 12 has a length of $$\frac{r}{\tan \gamma}$$

and the lever 13 a length of $$\frac{R}{\tan \gamma}$$

for reasons which will be explained hereinafter.

The lever 12 is rotated during the operation through 360° in the plane defined by the guiding means. The tube, which is cut, is connected to the means for rotating the lever so as to simultaneously turn about its axis. The smaller tube, which has to be cut around its entire perimeter, is rotated through 360°. The larger tube requires only cutting of a hole in its cylindrical surface and is only connected to the means for rotating the lever 12 to be oscillated about its axis in such manner that the sine of the angle through which the lever 12 is turned and the sine of the turning angle of the larger tube which is cut have the ratio of $R/r$.

The distance between the points 22 and 44 is $$\frac{r}{\tan \gamma}$$

when the smaller tube is cut as shown in Fig. 1, and $$\frac{r}{\sin \gamma}$$

if the larger tube is to be cut as shown in Fig. 2.

The sliding means at the points 11 and 44 have to be arranged on the lever 12 in such manner as not to interfere with each other. Consequently, the lever 12 is preferably constructed of two parallel spaced levers, one of which is connected to the sliding means 11, and the other of which is connected to the sliding means 44.

A practical embodiment of the arrangement schematically illustrated in Fig. 1 is shown in Fig. 1a. A drive motor 53 drives through gear means and bevel gears 57, the shafts 58 and 61, respectively. The tube $t$ is secured by holding means 59 to shaft 58. Shaft 61 is secured by clamping means 44' to the lever portion 12b which is connected by a transverse portion 12c to the lever portion 12a. It will be appreciated that lever 12, schematically shown in Fig. 1, actually comprises the three portions 12a, 12b and 12c. A sliding means 44" slides on guiding means 10, and has a bore in which shaft 61 is mounted for rotation. This construction is conventional, and is, for example, described in the U.S. Patent 2,039,584 to Dixon, issued May 5, 1936. Levers 12 and 13 are connected by pivot means 22. A clamping means 33" is secured to lever 13 and is pivotally connected to slide means 33' which slides on the guiding means 9. The tool 14 is secured to member 33'. Slide means 11' slides on the guiding means 9 and is connected by the lever portion 12c to a clamping means 11" secured to lever portion 12b. The elements 33' and 33" correspond to the sliding means 33 in Fig. 1, the elements 44' and 44" correspond to the sliding means 44 in Fig. 1 and the elements 11" correspond to the element 11 in Fig. 1.

Since one end of shaft 61 reciprocates with lever 12b and sliding means 44", shaft 61 is provided in a conventional manner with universal joint means corresponding to the arrangement shown in the U.S. Patent 876,351 which discloses a driven shaft having transversely reciprocating ends.

The operation of the tool guiding device according to the present invention will be best understood with reference to Figs. 3 to 6.

Figs. 3/1–5 schematically illustrate the movements of the cutting tool during cutting of the smaller cylindrical tube $t$. The larger tube is not shown in Fig. 3 and is assumed to extend at an angle $\gamma = 60°$ with respect to the tube $t$. The construction is illustrated in Fig. 3 with an assumed radius of the larger tube $R = 40$ mm., and a radius of the smaller tube $r = 35$ mm.

It will be understood that during the operation shown in Fig. 3, the tube $t$ rotates about its axis. The lever 12 is caused to simultaneously rotate while the ends of the levers 12, 13 are guided along the guiding means 9 which extends parallel to the axis of the tube. The tool is assumed to be attached to the point 33 and moves during rotation of the lever 12 consecutively to the points 1, 2, 3, 4, 5. The consecutive lever positions are illustrated below each other, but it will be understood that the guiding means 9 does not change its position with respect to the tube so that the points 1', 2', 3', 4' and 5' on the tube consecutively coincide with the points 1, 2, 3, 4, 5 during rotation of the tube $t$. Viewed in axial direction, the tube $t$ will appear as a circle on which the points 1", 2", 3", 4", 5" corresponding to the points 1', 2', 3', 4', 5' are spaced at equal distances. The curve 1', 2', 3', 4', 5' is the projection of half the cutting path, and the second portion of the curve is, of course, symmetrical thereto.

Two additive motions of the cutting tool are required for producing a three-dimensional curve, and the theory of the motions will be best understood by considering particular ratios between the radii of the two cylindrical tubes.

Assuming, for instance, an infinite radius of the larger tube, the same will be a straight wall and intersect with the tube $t$ shown in Fig. 3 along an ellipse which will appear in the projection of Fig. 3 as the straight broken line 1', 5'. For explanation purposes the tube portion bounded by an elliptical edge will be referred to hereafter as "angle portion." The angle portion of the tube is cut off by a plane extending at an angle $\gamma$ to the axis of the tube. As can be clearly seen in Fig. 3, proper joining of two tubes having definite radii will require an extension of the angle portion by a tubular wall portion extending between the ellipse indicated in Fig. 3 by the line 1', 5' and the three-dimensional curve located on the cylinder surface and appearing in the projection of Fig. 3 as the curve 1', 2', 3', 4', 5'. This tubular wall portion serves for extending the angle portion of the tube to the wall of the larger tube T, and will hereinafter be referred to as the "connecting portion."

Fig. 4 illustrates the cutting of an angle portion. It is assumed that a tube having a radius of 35 mm. intersects at an angle $\gamma$ of 60° a tube having an infinite radius, that is a straight wall.

Fig. 4/1 is a side view and Fig. 4/2 is a plan view of the cut tube. The elliptic edge 1', 2', 3', 4', 5', 6', 7', 8' appears as a straight line in Fig. 4/1.

Fig. 4/4 illustrates the lever 22, 44, the cutting tool being arranged at 22. The point 22 and thereby the cutting tool must move on its way around the tube first the distance $$+\frac{r}{\tan \gamma}$$

through 0 to $$-\frac{r}{\tan \gamma}$$

then again through 0 to $$+\frac{r}{\tan \gamma}$$

in order to produce the desired intersection curve located in a plane.

From the triangle 1', 3', 0''' in Fig. 4/1, tan $\gamma$ is found $$\frac{r}{0''', 3'}$$

Consequently tan $\gamma$ is $$\frac{r}{x}$$

wherein $x$ is 0''', 3'. The required length of the lever portion 22—44 is $$\frac{r}{\tan \gamma}$$

Since in Figs. 1 and 3 the lever 11—22 turns at the point 44, and in Fig. 4, the lever 22—44 also turns at point 44 at the same angular speed as the cut tube, the lever portion 22—44 in Figs. 1 and 3, as well as in Fig. 4, has always the same angular position during the operation assuming an equal length of $$\frac{r}{\tan \gamma}$$

Since under the conditions illustrated in Fig. 4 the tube intersects with a straight wall, that is, $R=\infty$, the lever 22—33 has a length of $$\frac{R}{\sin \gamma}=\frac{\infty}{\sin \gamma}=\infty$$

That means that in the event that R is $\infty$, in Fig. 3 only the movement of the point 22 in the direction of the guiding means 9 in Fig. 3 influences the movement of the tool. The reason therefore is that the motion of the point 22 can be divided into two components, one in the direction of the guiding means 10, and another component in the direction of the guiding means 9.

In the event that the lever 22—33 is of infinite length, the movement of the point 22 in the direction of the guiding means 10 has no influence any more on the longitudinal motion of the point 33 in the direction of the guiding means 9 since the angle defined at point 33 between the guiding means 9 and the lever 22—33, is infinitely small. The lever 22, 33, and its projection on the guiding means 9, have the same length, namely, an infinite length. A movement of the point 22 in the direction of the guiding means 10 in Fig. 3 has consequently no influence on the movement of the point 33.

The up and down movement of the point 22 in Fig. 3 has no influence on the movement of the point 33 if R equals $\infty$, and the point 33 performs the same movement in the operation of Fig. 3 as the point 22 in the operation of Fig. 4/4, since in Figs. 1 and 3, and in Fig. 4, the lever portion 22—44 acts in the same manner.

Consequently, it does not make any difference whether the point 22 slides on a guiding means parallel to the tube axis as shown in Fig. 4, or whether the point 22 is guided by the lever portion 11—22 having the sliding point 11 as shown in Fig. 3. The projection of the lever portion 22—44 is changed in Fig. 3, and in Fig. 1, respectively, in the same manner and effects a corresponding guiding of the tool mounted at point 33 in the construction of Figs. 1 and 3, and at point 22 in the construction of Fig. 4.

The proof of the fact that the length of the lever is correctly determined is found in Fig. 4/1. It is apparent, that the distance 3'—0''', which corresponds to the length of the lever, equals $$\frac{r}{\tan \gamma}$$

Fig. 4/4 also illustrates how the reciprocating movement of the point 22 corresponding to the cutting tool is effected. The lever 22—44, sliding with its end 22 on a guiding means extending parallel to the axis of the cut tube, and with its end 44 along a guiding means extending normal to this axis, turns through 360°. As pointed out above, the lever 44—22, and the tube $t$, which is the smaller tube as it intersects a tube of infinite radius, rotate at the same angular speed.

Fig. 5 illustrates another particular intersection of the two tubes. It is assumed that the tubes intersect at an angle $\gamma$ of 90° so that the "angle portions" need not be considered, as the connecting portion 1', 2', 3', 4', 5' joins the main portion of the tube along a circle located in a plane normal to the axis of the tube.

Since the apparatus does not have to move corresponding to an angle portion, but has to follow only the contour of a connecting portion in the arrangement illustrated in Fig. 5, the portion 22—44 of the lever system according to Figs. 3 and 4 is reduced to zero length and is omitted. The lever 22—44 has a length of $$\frac{r}{\tan \gamma}$$

Since $\gamma=90°$, tangent $\gamma=\infty$ and $$\frac{r}{\tan \gamma}=0$$

The lever system illustrated in Fig. 5 will therefore cut only a connecting portion. Such lever system consists of the levers 11—22 and 33—22. The pivoting point 22 in which the two levers are joined, is slidably guided along a guiding means 10 extending normal to the axis of the tube $t$. The lever 11—22 is turned at an angular velocity which equals the angular velocity of the tube $t$. Lever 11—22 has the length $r$, and lever 22—33 has the length R, since sin 90°=1.

The choice of the length of the levers will be best understood with reference to Figs. 5/5 and 5/9. In order to produce the desired curve, the cutting tool must move along the guiding means 9 through a distance whose projection on the axis of the tube is the difference between R and $\sqrt{R^2-r^2}$. The movement is obtained by the lever system illustrated in Fig. 5. The cutting operation starts in the position of Fig. 5/1. In Figs. 5/2–5/7 the positions are illustrated which the levers assume after each turning of the tube through 45°, and a corresponding turning of the lever 11—22 through 45°. The cutting tool located in point 33 consecutively reaches the points 1 to 7 and cuts the desired curve whose cutting is illustrated to the point 7 in Fig. 5/8 in a side view, and in Fig. 5/9 in a plan view. The distance $a$ in Fig. 5/8 is the distance between the point 7' and the point 0 at which the lines 1', 5', and 7', 7'' intersect. The distance $a$ in Fig. 5/8 corresponds to the distance $a$ in Fig. 3.

Referring again to the intersection of two cylindrical tubes at an acute angle as illustrated in Fig. 3, it will be understood that the operation required for cutting the desired curved edges is a combination of the operations illustrated in Figs. 4 and 5 as an angle portion as shown in Fig. 4, and a connecting portion as shown in Fig. 5 must be cut.

The lever portion 22—44 has a length of $$\frac{r}{\tan \gamma}$$

and is required for cutting the angle portion as explained with reference to Fig. 4. The levers 12 (11—22) and 13 (22—33) have the length $$\frac{r}{\sin \gamma}$$

and $$\frac{R}{\sin \gamma}$$

respectively.

For explanation purposes the distance through which the cutting tool located at point 33, moves for cutting the angle portion is designated with $x$, and the distance through which the cutting tool moves for cutting the connecting portion is designated with $y$. The perpendicular distance from point 3' to the line 1', 5' is designated with the letter $a$.

If the angle $\gamma$ at which the axes of the two tubes intersect were 90°, the maximal distance covered by the cutting tool 33 would be $a$. However, as for the cutting operation illustrated in Fig. 3 the angle $\gamma$ is acute, the cutting tool must move through a distance which consists of the distance $x$ required for the angle portion, and in addition to it through the distance $y$. The distance $$y = \frac{a}{\sin \gamma}$$

as is apparent from the rectangular triangle having the side $a$ and the hypotenuse $y$. As explained with reference to Fig. 5, the levers 11—22 and 22—33 have the lengths $r$ and R, respectively, if the tubes intersect at a right angle. The curves of intersection appears in the plan view as portions of circles 7', 8', 1', 2', 3' and 7', 6', 5', 4' and 3' having the radius R. If in the general case illustrated in Fig. 3, an angle portion has to be considered in addition to the connecting portion, the curve of intersection does not appear as portion of a circle, but has an irregular shape. An examination of Fig. 5/8 will prove that the point 33, which guides the tool, does not have to travel to point 1' but only to the point 1''' in the event that $\gamma$ is different from 90°. In expanded position, the levers must move the point 33 to the right for a distance 1', 1'''.

As can be seen from the triangle 1', 1''', 0, $$\tan \gamma = \frac{r}{1,1'''} \text{ and } 1', 1''' = \frac{r}{\tan \gamma}$$

Fig. 3 shows that the distance 1, 1''' is provided by the lever portion 22, 44, which equals $$\frac{r}{\tan \gamma}$$

In Fig. 3 point 33 is moved in the direction of the guiding means 9 to the right a distance plus $$\frac{r}{\tan \gamma}$$

See Fig. 3/1, and to the left a distance minus $$\frac{r}{\tan \gamma}$$

see Fig. 3/5.

If the lengths of the levers 11—22 and 22—33 are varied in such manner that the ratio of the lengths of the same is maintained $r/R$, the end positions of the point 33 corresponding to points 1 and 5 in Figs. 3/1 and 3/5 would always be spaced from each other the distance $$2 \cdot \frac{r}{\tan \gamma}$$

The angle portion is properly formed by means of the lever portion 22—44, which is $$\frac{r}{\tan \gamma}$$

In the event that $\gamma$ is 90°, the entire length of the levers is determined by the connecting portion.

As shown in Fig. 5, the point 33 to which the tool is attached, performs its movement within a distance 0, 7' which is the distance $a$. The distance $a$ is in a side view the distance between the line 1', 5' from the tangent passing through points 3' and 7', respectively. In the event that $\gamma$ is different from 90° as shown in Fig. 3, the edge of the connecting portion 1', 2', 3', 4', 5' is no longer symmetrical to the axis of the tube as viewed in a side view.

Since the guiding means 9 is not perpendicular to the tube in the arrangement of Fig. 3, the point 33 must be moved the distance $y$ in addition to the distance $$x = \frac{r}{\tan \gamma}$$

The distance $$y = \frac{a}{\sin \gamma}$$

In Fig. 5 the movement of the point 33 for the distance $a$ is obtained by turning the lever 11—22 through 90°, that is, from the position shown in Fig. 5/1 to the position shown in Fig. 5/3. In Fig. 3, however, not the distance $a$, but the distance $x$ plus $y$ must be obtained. The distance $x$ is already taken care of by the lever portion 44, 22, which is $$\frac{r}{\tan \gamma}$$

Instead of distance $a$, the distance $y$ must be obtained. If the length of the levers 11, 22 and 22, 33 are multiplied by $$\frac{y}{a} = \frac{1}{\sin \gamma}$$

a movement of the point 33 from the position 1 to the position 3 will obtain the desired distance $$y = a \cdot \frac{1}{\sin \gamma}$$

Referring now to Fig. 4a which illustrates a practical embodiment of the arrangement schematically illustrated in Fig. 4, a drive motor means 53 drives through gear means and bevel gears 57, a shaft 58 and a shaft 61. Holding means 59 are secured to shaft 58 and hold the tube $t$ which rotates with the shaft 58. The shaft 61 has one end portion turnably connected with the slide member 44'', which slides on guiding means 10, and clamping means 44' which correspond to the member 44 in Fig. 4. The clamping means 44' is shiftably secured to a lever 44'' which has at its end portion a pivot means 33b turnably mounted in a bearing 22' which is slidable on guide 9 and is connected to tool 14 by bar 50. The slide means 22' slides on the guiding means 9 which is parallel to the axis of the tube $t$.

A practical embodiment of the construction as described with reference to the schematic Fig. 5 is shown in Fig. 5a. A drive motor 53 drives through gear means and bevel gears 57 to shafts 58 and 61. Shaft 58 carries a holding means 59 for the tube $t$. On the guiding means 9 two slide means 11' and 33' are arranged which are connected to clamping means 11a and 33b, respectively. Slide means 33' is connected with tool 14 and corresponds to the slide means 33 in Fig. 5. Lever 12, consisting of two parallel lever parts 12a and 12b, and lever 13 are clamped by the clamping means 33b and 11a and are pivotally connected to each other. The shaft 61 is turnably connected to the slide means 22 which slides on the guiding means 10.

Fig. 6 illustrates an arrangement for guiding a cutting tool by a guiding lever system for cutting a hole in the larger tube T, to which a smaller tube has to be fitted. Basically the operation is similar to the operation explained with reference to Figs. 3 to 5, and therefore the cutting of the larger tube will be understood without difficulty with reference to Fig. 6 in which the intersection of a larger and smaller tube at an angle different from 90° is shown.

As compared with the cutting of the ends of a smaller tube, as shown in Fig. 3, the operation shown in Fig. 6 requires movement of the cutting tool parallel to the axis of the tube T. It will be appreciated that the same three-dimensional curve must now be produced by a cutting tool moving in a different direction with respect to the curve so that the dimensions of the lever system must be changed correspondingly.

In the arrangement shown in Fig. 6 the distances $x$ and $y$ extend now in the direction of the axis of the cut tube and are located on the generatrix which appears on top of the tube T in Fig. 6.

The distance $$x = \frac{r}{\sin \gamma}$$

the distance $$y = \frac{a}{\tan \gamma}$$

and the lever 22—24 has a length of $$\frac{r}{\sin \gamma}$$

The levers 22—33, and 22—11 have a length of $$\frac{r}{\tan \gamma}$$

and $$\frac{R}{\tan \gamma}$$

respectively.

Since in the arrangement shown in Fig. 6 for cutting a hole in the larger tube T the reciprocating movement of the cutting tool is parallel to the axis of the cut tube, rotation of the tube would result in cutting off of the tube. For the cutting of a hole in the larger tube T it is therefore necessary that the tube T is oscillated about its axis for forming consecutively the two geometrical portions of the curve 1, 2, 3, 4, 5, 6, 7 whose projections cover each other in Fig. 6.

Referring now to Fig. 8, the left portion of this figure illustrates the tube T, and the right portion of this figure illustrates the smaller tube $t$ in a schematically turned position. A lever system is provided for producing the oscillations of the larger tube T during the cutting operation. The lever 28' has the length of the radius R of the tube T, and the lever 26' has the length of the radius $r$ of the smaller tube $t$. Two consecutive positions of the lever system 28', 26' are illustrated in Fig. 8.

Starting from the point 1' located on the periphery of the tube T, and corresponding to the point 1" on the periphery of the smaller tube $t$, the tube T must be turned in such manner that the cutting tool arrives at point 2' which corresponds to point 2". In point 2" the lever system 28', 26' is in the position illustrated in broken lines. The angle $\beta$ determines the position of a point of the tube T during the oscillation of the same, and the angle $\delta$ determines the position of the corresponding point on the small tube $t$. Consequently $$\sin \beta \text{ equals } \frac{z}{R} \text{ and } \sin \delta \text{ equals } \frac{z}{r}$$

from which follows $$\frac{\sin \delta}{\sin \beta} = \frac{R}{r}$$

Fig. 7 shows an apparatus according to the present invention for oscillating a tube according to the requirements determined by Fig. 8.

The tube T, not shown in Fig. 7, is fixedly connected to the disc 23. A slotted crank lever 25 is turnably mounted on the shaft 24 of the disc 23 and is rotated by drive means in synchronism with the lever 12, as shown in Figs. 1 and 2. A wrist pin and slide block means 26 is adjustably arranged in the slot of the crank lever 25, the slide block 26 sliding in a guiding slot of a guiding member 27 which is secured to a guide member 29. Member 29 is slidably guided on supports 29' for movement normal to the direction of the axis of the disc 23 and the tube T. A slide block 28 is turnably mounted on the disc 23 and projects into the guiding slot of the member 27 so that rotation of the crank 25 causes a reciprocating movement of the guide member 27 and thereby the desired oscillation of the disc 23.

The adjustable wrist pin and slide block 26 is secured to lever 25 in a position in which the distance between the axis 24 and the slide block 26, and the distance from the axis 24 to the slide block 28 have a ratio of $r/R$. A comparison of the arrangement shown in Fig. 7 with the practical embodiment shown in Fig. 8 will prove that the sine of the turning angle $\beta$ of the tube T, and the sine of the turning angle $\delta$ of the shorter lever 26' in Fig. 7, have the same ratio as the radius $r$ of the smaller tube $t$ and the radius R of the larger tube T.

The arrangement for cutting the curve of intersection into a larger tube T as schematically illustrated in Figs. 2 and 6, is shown in a practical embodiment in Fig. 2a. A drive motor 53 drives through gear means and bevel gears 57, the shafts 58a and 61. Shaft 58a carries lever 25 with a wrist pin and slide block means 26 as described with reference to Fig. 7. A disk 23 having a shaft 24 cooperates with a lever 25, and drives shaft 58b, corresponding to shaft 24 in Fig. 7, in an oscillating movement by which the tube T is oscillated through holding means 59. Shaft 61 is connected to a clamping means 44', and is turnably mounted in a slide means 44" which slides on the guiding means 10. The clamping means 44' is clamped to the lever portion 12b of lever 12a, 12b, 12c which corresponds to lever 12 in Fig. 2. A clamping means 11" connects the lever portion 12a and 12c. The end of lever 12a is connected by pivot means 22 to the lever 13. Lever portion 12c is turnably mounted in the slide means 11' which is slidably guided on guide means 9. The free end of lever 13 is clamped by clamping means 33" which is turnably connected to a slide means 33' which is fixedly connected to the tool 14. Slide means 33' is slidable on the guide means 9. Guide member 29 is secured to member 27 and is slidable in supports 29', as described with reference to Fig. 7.

Since one end of shaft 61 reciprocates with lever 12b and sliding means 44" shaft 61 is provided in a conventional manner with universal joint means corresponding to the arrangement shown in the U.S. Patent 876,351 which discloses a driven shaft having transversely reciprocating ends.

Slide 44" guides shaft 61 along guiding means 10 in a conventional manner as, for example described in the U.S. Patent 2,039,584 to Dixon, issued May 5, 1936.

Fig. 9 illustrates a modified embodiment of the present invention which is particularly advantageous for practical embodiments of the present invention. Compared with the construction shown in Fig. 1, the modified embodiment of Fig. 9 does not require a guiding means which is normal to the axis of the tube which is to be cut.

While in Fig. 1 the points 33 and 11 slide along the guiding means 9, the corresponding points 55 and 33' in Fig. 9 slide on the guiding means 9'. The points 55 and 66 in Fig. 9 correspond to the points 55 and 66 in Fig. 1. The levers 12' and 13' are pivotally connected at 22', and the end 55 of the lever 13' is slidably guided on the guiding means 9', while the end 66 of the lever 12' is a fixed pivot point about which the lever 12' turns and located on the guiding means 9'.

A third lever 55'—33' is pivotally connected at one end 55' with the lever 12', while the other end 33' of the third lever slides on the guiding means 9'.

In this modified construction the length of the lever portions 22'—55' and the length of the entire lever 12' (22'—66) have the ratio $R/r$.

As previously explained, two levers whose lengths have a ratio $R/r$ are required for producing the edge of the connecting portion. Since in the embodiment of Fig. 9 one of the levers is subdivided, the other lever must be subdivided in the same ratio so that in each part the ratio $R/r$ is maintained. Consequently the distance $$\frac{55'-33'}{55'-66} = \frac{R}{r}$$

In Figs. 1 and 9 the projections of the levers in certain positions of the cutting tool during the operation are designated by the characters A and W, and $A_1$, W, and $A_2$, respectively.

Due to the subdivision of the lever 13 of the construction of Fig. 1 into two portions 55, 22', and 55', 33' in Fig. 9, the distances $A_1$ and $A_2$ in Fig. 9 correspond to the distance A in Fig. 1. In order to maintain the correct length of the projection $A_2$, the lever 55'—33' must always define the same angle with the guiding means 9', as the lever 55—22'. The ratio $$\frac{55'-33'}{55'-66} = \frac{R}{r}$$

obtains this result. In other words, the angle at 55 and 33' will be equal if the ratio $R/r$ is maintained for the lever system connecting the points 66, 55' and 33'.

In the modified embodiment shown in Fig. 9, the lever 12' is turned in the direction of the arrow about the point 66 at a predetermined angular velocity. During the turning of the lever the distance between the two points 55 and 33' changes corresponding to the desired curve of intersection of the two tubes. Since both points 55 and 33' are in motion, it is necessary to transform such motion into a movement of the cutting tool starting from a fixed point. A rope 31 whose ends are fixedly secured to the points 55 and 133 is guided about a pulley 32 whose axis is fixed, and about another pulley 34 whose shaft is mounted for movement parallel to the guide means 9'. The axis of pulley 34 is connected to the axis of a third pulley 35 which is guided for movement in the same direction as pulley 34. A second rope 36 is fixedly mounted at one end thereof, passes over the pulley 35 and is secured at the other end thereof to a slide member 37 which slides on a guiding means 38 extending parallel to the guiding means 9'. The cutting tool 14' is carried by the slide member 37. It will be understood that the cutting tool 14' moves along the guide means 38 a distance which corresponds to the distance between the points 55 and 33'. A practical embodiment of the construction of Fig. 9 is illustrated in Fig. 9a. A drive motor 53 drives through gear means and bevel gears 57, shafts 58 and 61' which are mounted in bearings 161. Shaft 58 drives through holding means 59 a tube $t$. Shaft 61' is secured to a clamping means 66 which clamps the lever portion 12'b. The other lever portion 12'a is pivotally connected at 22' to lever 13'. A bearing means 55' is turnably connected to lever 12' and to lever 12''. The other end of lever 12'' is clamped by a clamping means 33' which is fixedly connected to a slide means 33'' which slides on guiding means 9'. A slide means 55b slides on guide means 9' and is connected to a clamping means 55a which is clamped to lever 13'. A rope 31 passes about pulley means 32, 34 and is secured at the ends thereof to members 33'' and 55b, respectively. Pulley 34 is movable and connected to another pulley 35 about which a rope 36 passes whose end is secured to a slide member 37 which carries the tool 14' and slides on guide means 38.

A further modified embodiment of the present invention is illustrated in Fig. 10. According to this embodiment the levers 12 and 13 are subdivided by a guiding means 9'' which is parallel to the axis of the tube and passes through the point 44 in Fig. 1. The end point 33'' is guided on a guide means 10'' which extends normal to the guide means 9'', and is slidably mounted on the same.

In the construction shown in Fig. 10, the lever arms 22''—77 and the lever arms 22''—44'' must have the ratio $R/r$ as, corresponding to the requirement valid for all embodiments of the present invention, the lever arms for cutting the connecting portion must have the same ratio as the radii of the two tubes.

The distance A corresponds to the motion required for cutting the connecting portion, and the distance W corresponds again to the motion for cutting the angle portion. The operation of the lever system in Fig. 10 corresponds to the operation of the lever system in Fig. 1.

The lever 22''—44'' has the length $$\frac{r}{\tan \gamma}$$

corresponding to the length of the lever arm 22—44 in Fig. 1, and since the ratio between the lever 22''—44'' and the lever 22''—77 is $r/R$, the lever portion 22''—77 has only the length $$\frac{R}{\tan \gamma}$$

Correspondingly, since the length of the lever 22—33 in Fig. 1 is $$\frac{R}{\sin \gamma}$$

the lever 22''—33'' in Fig. 10 has the length $$\frac{R}{\sin \gamma}$$

The lever 22''—44'' is turned in the direction of the arrow at a predetermined angular velocity while the point 33'' slides along the guide means 10'' and moves the same parallel to itself along the guide means 9'' in a movement which corresponds to one dimension of the curve to be cut on the tube. Consequently the cutting tool 14'' is secured to the guide means 10'' for movement with the same along the guiding means 9''. A practical embodiment of the construction shown in Fig. 10 is illustrated in Fig. 10a. A drive means 53 drives through gear means and bevel gears 57 the shaft 58 which is secured to holding means 59 for turning the tube $t$. Shaft 61' is turnably mounted in a bearing 44a and connected to lever 12 by adjustable clamping means 44b. Lever 12 is turnably connected at 22'' to lever 13 which is pivotally connected by a pin 33'' to a sliding member 10'' which is slidably guided on guide means 9. Slide means 10'' is fixedly connected to the tool 14. A clamping means 77'' is clamped to lever 13 and pivotally connected to a sliding means 77' which slides on guide means 9.

Fig. 11 illustrates another modified embodiment of the present invention which is particularly advantageous from the point of view of the mechanical construction of the apparatus of the present invention.

In the embodiment shown in Fig. 11 the lever portion 42, 45 has a constant length K and need not be varied regardless of the radius of the tube which is cut.

The operation of the embodiment shown in Fig. 11 is similar to the operation explained with reference to Fig. 10. The guide means 9" of Fig. 10 is somewhat raised in Fig. 11 relative to the lever system. Since the fixed turning point 44" of Fig. 10 is in the construction of Fig. 11 not located on the guide means 46 (which corresponds to the guide means 9" in Fig. 10) but lower, the horizontal guide means 46 must be shiftable parallel to itself.

The practical embodiment of an apparatus according to the present invention which is shown in Fig. 12 corresponds to the construction schematically shown in Fig. 11, and therefore corresponding parts in Figs. 11 and 12 are designated by the same reference numerals.

The ratio between the lever arms 42, 45 and the lever arms 42, 47 must be again $r/R$, and since 42, 45 is a constant distance K, the ratio $$\frac{r}{R} = \frac{K}{K \cdot \frac{R}{r}}$$

As explained with reference to Fig. 10, the lever 42, 41 has the length $$\frac{r}{\tan \gamma}$$

and the lever 42, 43 has the length $$\frac{R}{\tan \gamma}$$

The vertical guide means 49 is fixedly secured to a rod 50 which carries the cutting tool 51 and is slidably mounted in a support 49' so that the guide means 49 can be reciprocated by the lever 42, 43 parallel to the axis of the tube 52 while remaining in its vertical position. The points 45 and 47 represent slide means by which the lever system is guided for movement along the guide means 46.

Referring now to the embodiment of the invention shown in Fig. 12, the smaller tube 52 has a radius $r$ and the larger tube 60 has a radius R. Since Fig. 12 illustrates the cutting of the smaller tube 52 during which the larger tube is not required, the larger tube 60 is shown in thin lines for illustrating the relative position of the two tubes. The axes of the two tubes are assumed to extend at an angle $\gamma$.

The tube 52 which is to be cut, is mounted on the suitable holding means 59 and is rotated through shaft 58 by a motor 53 at a predetermined rotary speed. If the larger tube T is cut, the crank 25, shown in Fig. 7, is connected to shaft 58 for rotation and effects oscillation of the tube T. The motor 53 drives through the bevel gears 57 and the shaft 57' the lever system by which the tool 51 is operated corresponding to Fig. 11.

The lever 41, 42 in Fig. 11 consists in the embodiment shown in Fig. 12 of a first portion 41a, a second portion 41b extending normal to the portion 41a, and a third portion 41c extending again parallel to the portion 41a. The portion 41a is fixedly secured to the auxiliary shaft 57' by the clamping member 41 and rotates with shaft 57' so that the pivot joint 42 rotates also about the axis of the shaft 57', while the slide member 45 slides on the guide means 46. To the ends of guide member 46 the bars 48 are secured which are slidable in supports 48'. Consequently, during rotation of the joint 42 about the axis of the shaft 57', the slide member 45 will reciprocate the guide means 46 while sliding on the same as will be best understood with reference to the side elevation of Fig. 11.

The lever arm 41c has the constant length K, while the lever portion 41a is adjusted by shifting the lever portion 41a in the clamping means 41 in such manner that the radial distance between the axis of the shaft 57' and the joint 42 equals $$\frac{r}{\tan \gamma}$$

In a similar manner, the clamping means 47 are used for adjusting the length of the lever arm 47a to the desired length of $$K \cdot \frac{R}{r}$$

The length of the lever arm 47b is adjusted by the clamping means 43a so that the total distance between the points 42 and 43 is equal to $$\frac{R}{\sin \gamma}$$

The clamping means 47 is fixedly connected to the slide means 47' which also slides on the guide means 46. The clamping means 43a is fixedly connected to the slide member 43 which slides along the guiding rod 49 and moves the same in horizontal direction together with the rod 50 which is guided in longitudinal movement in the support 49'. The rod 50 carries an operating member, such as the cutting tool 51, and is connected by a rope passing over a pulley 50b with a weight 50a which facilitates the reciprocation of the rod 50.

For the proper operation of the apparatus according to the present invention it is desirable that the relative speed between the cutting tool and the cut surface of the tube is substantially constant. Since a cutting torch is generally used for the cutting operation according to the present invention, a certain adjustment of the cutting flame, together with a predetermined wall thickness of the cut tube, requires a predetermined speed of the cutting tool for obtaining a clean cut. According to the present invention control apparatus for controlling the rotary speed of the drive motor is provided for maintaining substantially constant the relative speed between the cutting tool and the cut surface. The control motor 54 cooperates with an electric control means to adjust the rotary speed of the drive motor 53 in such manner that the cutting tool moves relative to the surface of the cut tube at a substantially constant speed. Referring again to Fig. 12, the tool 51 is illustrated in a dead-center position of its reciprocating movement. In the dead-center position the relative speed between the cutting tool and the tube surface corresponds for a very short time to the peripheral speed of the tube. When the cutting tool 51 starts its stroke to the left in Fig. 12, an axially directed speed component is added to the speed component in the direction of the circumference of the tube. The vector sum of the speeds of tube and tool is consequently smallest at the dead-centers of the reciprocating motion of the cutting tool, and obtains its maximum value in a position intermediate the dead-centers. It is desired that the relative speed between the tool and the tube surface is maintained constant, and therefore the drive motor 53 must be so regulated that the vector sum of the speeds of the tube surface and of the cutting tool is constant for practical purposes.

This result is obtained by operating means including a member 261 which has an inner thread, and a threaded spindle 54' driven by the control motor 54, so as to move member 261 in axial direction of the spindle when the same is rotated. A contact 63 is articulated on one hand to member 261 and on the other hand to a clamping member 64 which is clamped to the member 50. When the member 50 moves together with the cutting tool 51 to the left as viewed in Fig. 12, the contact 63 is pressed against the left contact 56 of two reversing contact means 56 on member 261. Thereby a circuit is closed which connects the control motor 54 with a source of electric current so that the motor 54 turns and rotates the spindle 54' in a direction of rotation which effects movement of member 261 in the direction of the movement of the cutting tool, that is, to the left in Fig. 12, whereby the reversing contact means contacts 56, 63 is again opened. As long as contact 56, 63 is closed, a relay 65 which is connected into the circuit of the motor 54, is energized and controls the drive motor 53 so that the same is reduced in speed or stopped. This operation of the relay 64 takes place regardless of the direction of the stroke of the cutting tool 51. During the stroke of the cutting tool 51 in opposite direction the contact 63 engages the other contact 56 on the contact member 261, and the control motor 54 is energized to rotate in the opposite direction. The current flows always in the same direction through relay 65 and temporarily acts on the motor 53 so that by rapidly repeated control operations of the reversing contacts 63, 56 the relative speed between the cutting tool and the tube is maintained substantially constant. The operation of the apparatus has been described with reference to a cuting tool, but it will be understood that the apparatus according to the present invention does not exclusively serve for moving a cutting tool, such as an oxyacetylene torch, along the wall of a metal tube, but may serve any purpose requiring a mechanical motion of a member along the intersecting lines of two cylindrical members.

It will be understood that each of the elements described above, or two or more together, may also find a useful application in other types of tool guiding devices differing from the types described above.

While the invention has been illustrated and described as embodied in a device for guiding a cutting tool along the curve of intersection of two intersecting cylindrical tubes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications and, therefore, such adaptations should and are intended to be comprehended within the meaning and range of equivalence of the following claims.

What is claimed as new and desired to be secured by Letters Patent is:

1. In a device of the type described, in combination, first straight guiding means; second straight guiding means extending transverse to said first straight guiding means; first lever means mounted at one end thereof turnably and slidably on said first straight guiding means, said first lever means being mounted at a point between its ends turnably and slidably on said second straight guiding means; a second lever means pivotally connected at one end thereof to the other end of said first lever means and turnably mounted at a point spaced from said one end thereof on one of said straight guiding means; drive means for turning one of said lever means about its point of mounting on that one of said first and second straight guiding means to which both said first and second lever means are attached; an operating member connected to one of said lever means, and being guided for rectilinear movement; and supporting means for supporting an object to be operated on by said operating member for movement in a direction transverse to the rectilinear movement of said operating member, said supporting means being connected to and moved by said drive means in synchronism with said one of said lever means.

2. In a device of the type described, in combination, first straight guiding means; second straight guiding means extending transverse to said first straight guiding means; first lever means mounted at one end thereof turnably and slidably on said first straight guiding means, said first lever means being mounted at a point between its ends turnably and slidably on said second straight guiding means; a second lever means pivotally connected at one end thereof to the other end of said first lever means and turnably mounted at a point spaced from said one end thereof on one of said straight guiding means; drive means for turning one of said lever means about its point of mounting on that one of said first and second straight guiding means to which both said first and second lever means are attached; an operating member connected to one of said lever means and being guided for rectilinear movement in the direction of said straight guiding means to which both lever means are attached; and turnable supporting means for supporting a tube for turning movement, said turnable supporting means having a turning axis extending parallel to said straight guiding means to which both lever means are attached, said supporting means being connected to and turned by said drive means in synchronism with said one of said lever means.

3. In a device of the type described, in combination first straight guiding means; second straight guiding means extending normal to said first guiding means; first lever means mounted at one end thereof turnably and slidably on said first straight guiding means, said first lever means being mounted at a point between its ends turnably and slidably on said second straight guiding means; a second lever means pivotally connected at one end thereof to the other end of said first lever means and being turnably and slidably mounted at the other end thereof on said first straight guiding means; drive means for turning said first lever means; an operating member connected to said second lever means at said other end of the same for rectilinear movement in the direction of said first guiding means; and turnable supporting means for supporting a tube for turning movement and having an axis extending parallel to said first straight guiding means, said supporting means being connected to and turned by said drive means in synchronism with said first lever means.

4. In a device for cutting a first cylindrical tube along the line of intersection of the same with a second cylindrical tube whose axis extends at an angle $\gamma$ with respect to the axis of said first cylindrical tube, said tubes having the radii R and r, respectively, in combination first straight guiding means adapted to extend parallel to the axis of the one of said tubes which is to be cut; second straight guiding means extending normal to said first guiding means; first lever means mounted at one end thereof turnably and slidably on said first straight guiding means, said first lever means being mounted at a point between its ends turnably and slidably on said second straight guiding means; a second lever means pivotally connected at one end thereof to the other end of said first lever means and being turnably and slidably mounted at the other end thereof on said first straight guiding means; drive means for turning said first lever means; an operating member connected to said second lever means at said other end of the same for rectilinear movement in the direction of said first guiding means; and turnable supporting means for supporting the cut tube for turning movement and having an axis extending parallel to said first straight guiding means, said supporting means being connected to and turned by said drive means in synchronism with said first lever means.

5. For working on a first cylindrical tube having an axis parallel to said guiding means to which both said lever means are attached, and a radius R greater than the radius r of a second intersecting tube whose axis extends at an angle $\gamma$ with respect to the axis of said first tube, a device as claimed in claim 2 wherein the length of said second lever means is $$\frac{R}{\tan \gamma}$$

wherein the distance between said other end of said first lever means and said point thereof located on said second guiding means is $$\frac{r}{\tan \gamma}$$

and wherein the length of said first lever means is $$\frac{r}{\sin \gamma}$$

6. For working on a first cylindrical tube having an axis parallel to said guiding means to which both said lever means are attached, and a radius $r$ smaller than the radius R of a second intersecting tube whose axis extends at an angle $\gamma$ with respect to the axis of said first tube, a device as claimed in claim 2 wherein the length of said first lever means is $$\frac{r}{\sin \gamma}$$

wherein the length of said second lever means is $$\frac{R}{\sin \gamma}$$

and wherein the distance between said other end of said first lever means and said point thereof is $$\frac{r}{\tan \gamma}$$

7. For working on a cylindrical tube having a radius $r$ smaller than the radius R of the other of said tubes, a device as claimed in claim 4, wherein the length of said second lever means is $$\frac{R}{\sin \gamma}$$

and wherein the length of said first lever means is $$\frac{r}{\sin \gamma}$$

8. A device as claimed in claim 2 wherein said drive means rotates said first lever means and said turnable supporting means at the same rotary speed.

9. A device as claimed in claim 2 and including means for oscillating said turnable supporting means about the axis thereof so that the sine of the turning angle of said turnable supporting means and the sine of the turning angle of said first lever means rotated by said drive means have the ratio $r/R$.

10. In a device for cutting a first cylindrical tube along the line of intersection of the same with a second cylindrical tube, in combination, first straight guiding means; second straight guiding means extending normal to said first guiding means and adapted to extend parallel to the axis of the tube which is to be worked on; first means supporting said second guiding means for movement in the direction of said first guiding means and parallel to itself; second means supporting said first guiding means for movement in the direction of said second guiding means and parallel to itself; first lever means mounted at one end thereof turnably and slidably on said first guiding means, said first lever means being mounted at a point between its ends turnable and slidable on said second straight guiding means; a second lever means pivotally connected at one end thereof to the other end of said first lever means and being turnably and slidably mounted at a point intermediate its ends on said second guiding means; means supporting the other end of said second lever means for turning movement of said second lever means about an axis extending normal to said first and second guiding means; a tool connected to said first guiding means for movement therewith in the direction of said second guiding means; turnable supporting means for supporting a tube to be worked on for turning movement and having an axis extending parallel to said second straight guiding means; and drive means for turning said first lever means and said turnable supporting means in synchronism.

11. In a device for cutting a first cylindrical tube along the line of intersection of the same with a second cylindrical tube whose axis extends at an angle $\gamma$ with respect to the axis of said first cylindrical tube, the greater of said tubes having the radius R and the smaller of said tubes having the radius $r$, in combination, first straight guiding means; second straight guiding means extending normal to said first guiding means and adapted to extend parallel to the axis of the tube which is to be worked on; first means supporting said second guiding means for movement in the direction of said first guiding means and parallel to itself; second means supporting said first guiding means for movement in the direction of said second guiding means and parallel to itself; first lever means mounted at one end thereof turnably and slidably on said first guiding means, said first lever means being mounted at a point between its ends turnable and slidable on said second straight guiding means, said first lever means having a length of $$\frac{R}{\sin \gamma}$$

a second lever means pivotally connected at one end thereof to the other end of said first lever means and being turnably and slidably mounted at a point intermediate its ends on said second guiding means, the distance between said point and said one end of the second lever means being constant, and the length of the second lever means being $$\frac{r}{\tan \gamma}$$

means supporting the other end of said second lever means for turning movement of said second lever means about an axis extending normal to a plane defined by said first and second guiding means; a tool connected to said first guiding means for movement therewith in the direction of said second guiding means; turnable supporting means for supporting a tube to be worked on for turning movement and having an axis extending parallel to said second straight guiding means; and drive means for turning said first lever means and said turnable supporting means in synchronism.

12. A device of the type claimed in claim 2 and including oscillating means interconnecting said drive means and said turnable supporting means, said oscillating means including a disc connected to the turnable supporting means for rotation and being coaxial therewith; a crank lever having a slot and being connected to said drive means for rotation about said turning axis of said supporting means; a slotted guiding member; a movable guide member secured to said guiding member and guiding the same for straight movement transverse to said turning axis; a wrist pin and slide block means adjustably mounted in said slot of said crank lever and sliding in said slotted guiding member; and a slide block secured to said disc and sliding in said slotted guiding member.

13. An arrangement as claimed in claim 12 wherein the distance between said turning axis and between said wrist pin and slide block means, and the distance between said axis and said slide block on said disc have a ratio $r/R$, R being the radius of a cylindrical tube supported by said turnable supporting means, and $r$ being the radius of another tube intersecting said first mentioned tube.

14. An arrangement as claimed in claim 11 and including control apparatus for maintaining constant the relative speed between the cutting tool and the surface of the cut tube, said control apparatus comprising electric control means actuated by said tool and connected to said drive means for controlling the rotary speed of the same.

15. An arrangement as claimed in claim 11 and including control apparatus for maintaining constant the relative speed between the cutting tool and the surface of the cut tube, said control apparatus comprising a circuit including an electric control motor and a relay means; a reversing contact means connected into said circuit and including a movable contact member actuated by said tool to close said reversing contact means during movement of said tool whereby said control motor is rotated in opposite direction corresponding to the direction of movement of said tool; operating means connecting said contact means with said control motor for interrupting said reversing contact means, said relay means being energized by said reversing contact means in closed position and being connected to said drive means for controlling the speed of the same when energized.

16. In a device for cutting a tube along the line of intersection of the same with another tube, in combination, first guiding means; second guiding means extending transverse to said first guiding means; first lever means mounted at one end thereof turnable and slidable on said first guiding means, said first lever means being mounted at a point between its ends turnable and slidable on said second guiding means; a second lever means turnably connected at one end thereof to the other end of said first lever means and being mounted at a point spaced from said one end thereof turnable on one of said guiding means; drive means for turning one of said lever means about one of the mounting points thereof; an operating tool connected to one of said lever means and being guided for rectilinear movement; and turnable supporting means for supporting one of said tubes and having a turning axis parallel to the direction of movement of said operating member and adapted to coincide with the axis of said one tube, said supporting means being connected to and turned by said drive means in synchronism with said one of said lever means.

17. In a device for cutting a tube along the line of intersection of the same with another tube, in combination, first straight guiding means; second straight guiding means extending transverse to said first straight guiding means; first lever means mounted at one end thereof turnable and slidable on said first straight guiding means, said first lever means being mounted at a point between its ends turnable and slidable on said second straight guiding means; a second lever means turnably connected at one end thereof to the other end of said first lever means and being mounted at a point spaced from said one end thereof turnable on one of said guiding means; drive means for turning one of said lever means about its point of mounting on that one of said first and second straight guiding means to which both said first and second lever means are attached; an operating tool connected to one of said lever means and being guided for rectilinear movement; and turnable supporting means for supporting one of said tubes and having a turning axis parallel to the direction of rectilinear movement of said operating member and adapted to coincide with the axis of said one tube, said supporting means being connected to and turned by said drive means in synchronism with said one of said lever means.

References Cited in the file of this patent

UNITED STATES PATENTS

| | | |
|---|---|---|
| 766,158 | Starr | July 26, 1904 |
| 1,963,537 | Tweit | June 19, 1934 |
| 2,379,630 | Fall | July 3, 1945 |